United States Patent [19]

van der Lely

[11] 4,090,569
[45] May 23, 1978

[54] SOIL CULTIVATING IMPLEMENTS

[76] Inventor: Cornelis van der Lely, 7, Bruschenrain, Zug, Switzerland

[21] Appl. No.: 691,987

[22] Filed: Jun. 2, 1976

[30] Foreign Application Priority Data

Jun. 5, 1975 Netherlands .................. 7506652

[51] Int. Cl.² ............................................. A01B 33/06
[52] U.S. Cl. .................... 172/59; 172/117; 172/68
[58] Field of Search .............. 172/49, 59, 63, 111, 172/68, 526, 523, 96, 117, 47

[56] References Cited

U.S. PATENT DOCUMENTS

| 25,736 | 10/1959 | Hogle | 172/526 |
|---|---|---|---|
| 94,482 | 9/1869 | Estes | 172/526 |
| 937,607 | 10/1909 | Hoover | 172/526 |
| 3,616,862 | 11/1971 | Lely | 172/59 |
| 3,667,551 | 6/1972 | Lely | 172/125 |

FOREIGN PATENT DOCUMENTS

| 1,109,215 | 9/1955 | France | 172/59 |
|---|---|---|---|
| 1,048,059 | 12/1958 | Germany | 172/111 |
| 77,205 | 8/1918 | Switzerland | 172/49 |
| 847,413 | 9/1960 | United Kingdom | 172/523 |

Primary Examiner—Richard J. Johnson
Attorney, Agent, or Firm—Mason, Mason & Albright

[57] ABSTRACT

A cultivating implement has a row of soil working members that rotate about corresponding upwardly extending shafts that are driven by a common driving transmission. Each soil working member is independently connected to the implement frame by a linkage that permits pivoting to avoid an obstacle. Each member includes a horizontal arm with a stub shaft at each end of that arm and a tool that freely rotates about its respective stub shaft when the tool's tines contact the ground. The soil working members are mounted in a row that extends transverse to the direction of implement travel. A supporting roller is adjustably connected to the frame parallel to the row and can be used to regulate the working depths of the tines.

7 Claims, 6 Drawing Figures

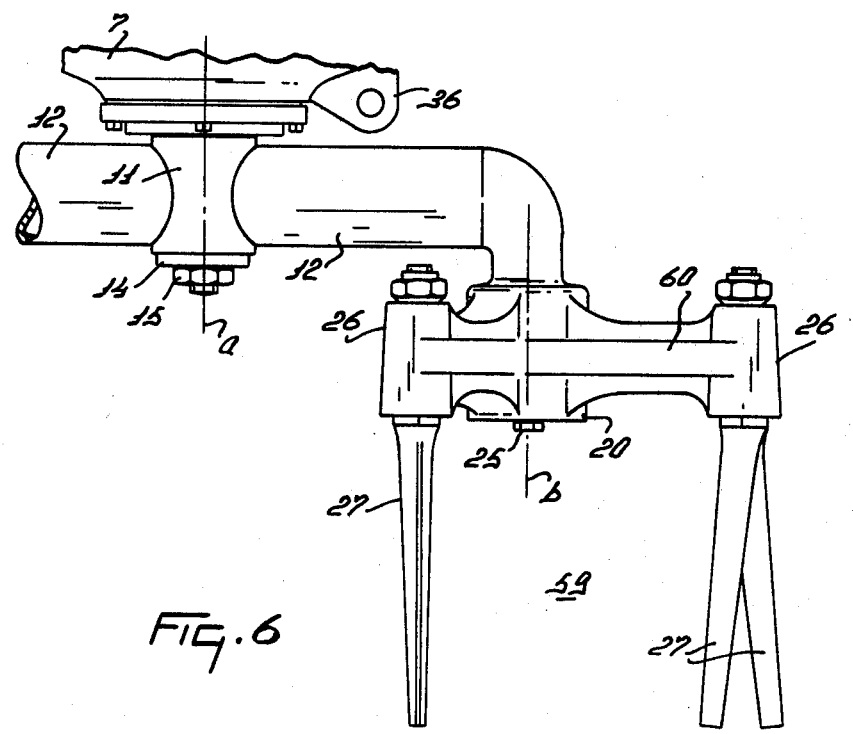

SOIL CULTIVATING IMPLEMENTS

According to one aspect of the invention, there is provided a soil cultivating implement of the kind set forth, wherein the or each soil working or cultivating member is arranged to be positively power-driven about said axis or the corresponding axis and is provided with two tools that are arranged to be driven, during operation of the implement, by their contact with the soil.

Figure 1:
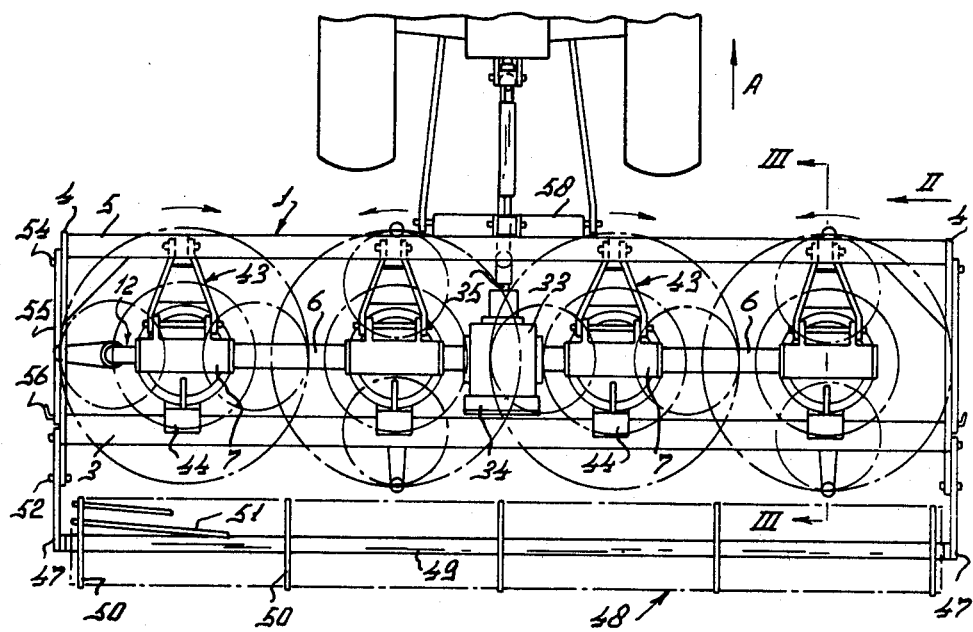
Figure 2:
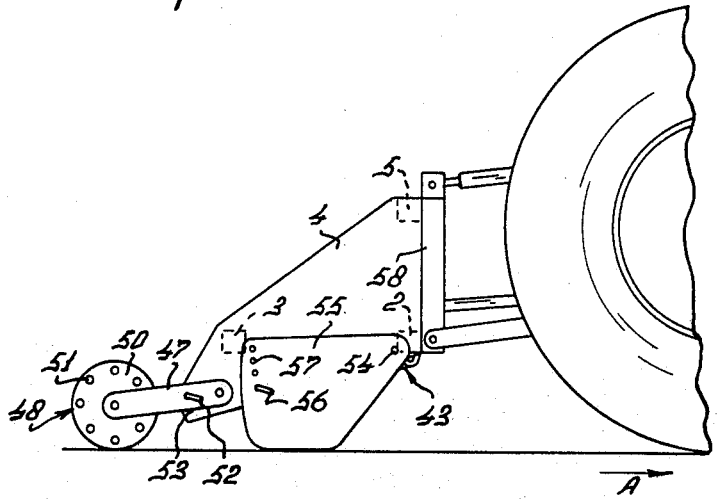
Figure 3:
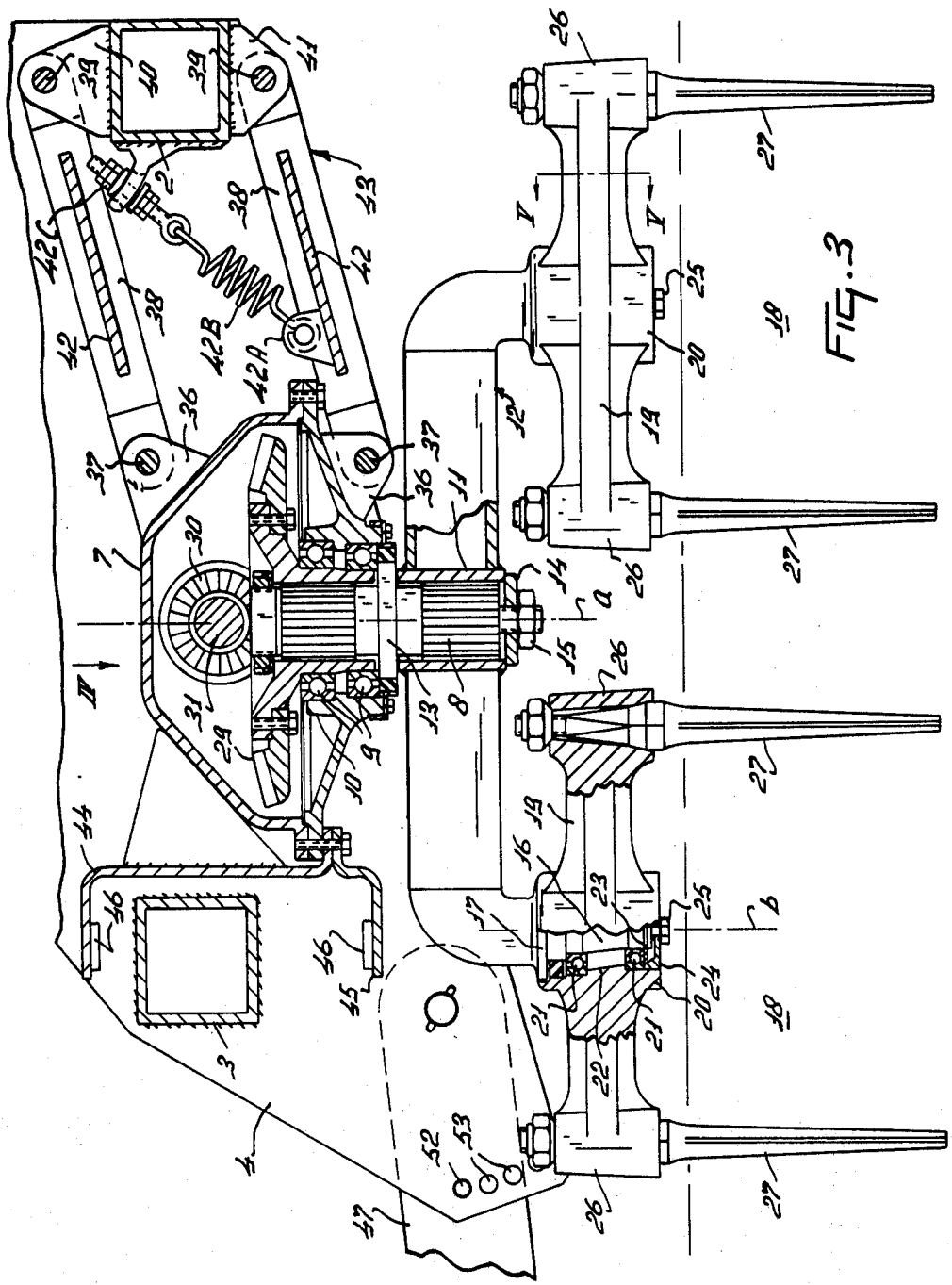
Figure 4:
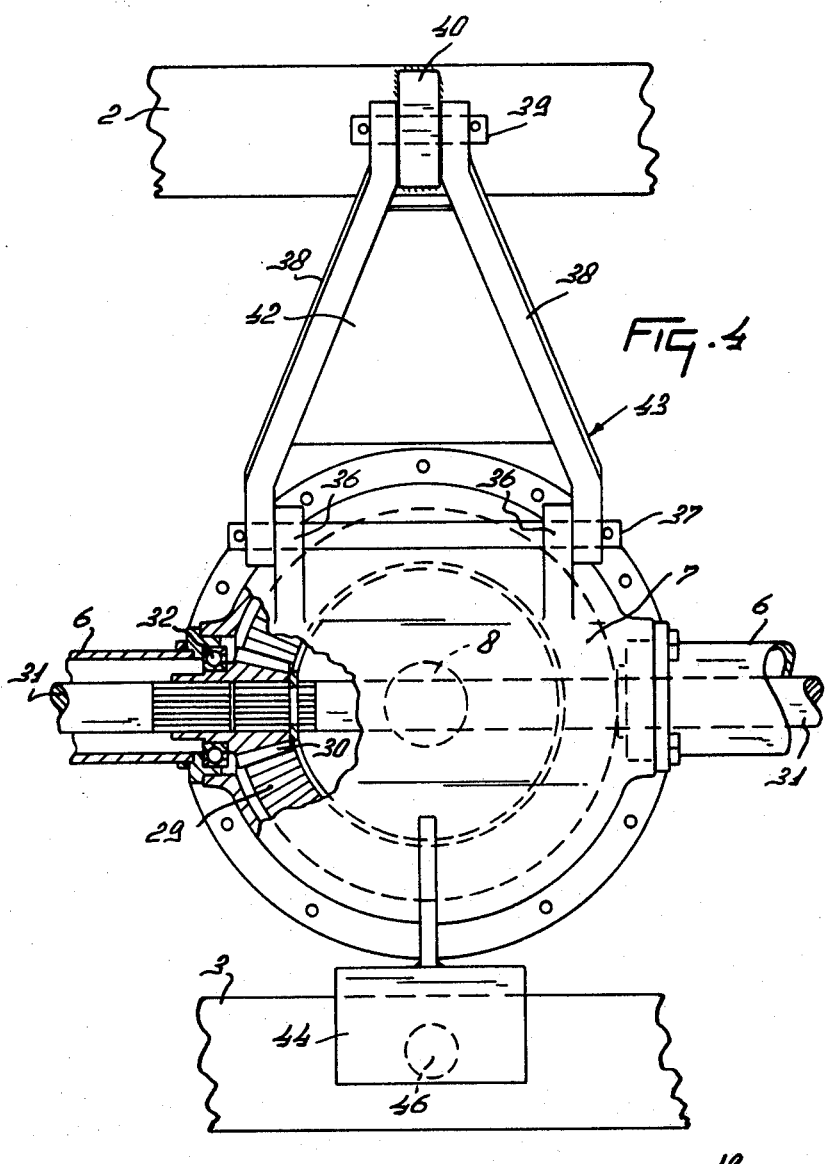
Figure 5:
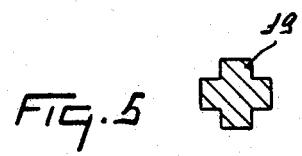

For a better understanding of the invention, and to show how the same may be carried into effect, reference will now be made, by way of example, to the accompanying drawings, in which:

FIG. 1 is a plan view of a soil cultivating implement in accordance with the invention connected to the rear of an agricultural tractor, FIG. 2 is a side elevation as seen in the direction indicated by an arrow II in FIG. 1, FIG. 3 is a section, to an enlarged scale, taken on the line III—III in FIG. 1, FIG. 4 is a part-sectional plan view as seen in the direction indicated by an arrow IV in FIG. 3, FIG. 5 is a section taken on the line V—V in FIG. 3, and FIG. 6 is a somewhat similar view to FIG. 3 but illustrates a rotary soil working or cultivating member provided with tools of an alternative form.

Referring to FIGS. 1 to 5 of the drawings, the soil cultivating implement that is illustrated therein comprises a frame that is generally indicated by the reference 1, said frame including two beams 2 and 3 that extend substantially horizontally transverse, and usually substantially horizontally perpendicular, to the intended direction of operative travel of the implement that is indicated by an arrow A, the two beams 2 and 3 being in parallel relationship with the beam 3 spaced rearwardly from the beam 2 with respect to the direction A but at the same horizontal level as the beam 2. Each of the beams 2 and 3 is of square cross-section and, while this cross-sectional configuration is preferred, beams of other polygonal cross-sections may also be used. Side plates 4 that are both substantially vertically disposed in substantially parallel relationship with the direction A interconnect the ends of the two beams 2 and 3, said side plates 4 being of an irregular shape which can be seen in respect of one of them in FIG. 2. The side plates 4 extend rearwardly with respect to the direction A beyond the rear frame beam 3 and, in addition to their interconnection by way of the beams 2 and 3, they are rigidly interconnected by a third frame beam 5 that extends parallel to the beams 2 and 3 at a location spaced vertically above the beam 2, the beam 5 being of the same cross-sectional shape as the two beams 2 and 3. A common support 6 of circular cross-section is connected to the frame beam 2 in a manner that will be further described below so as to extend parallel to that beam in an upwardly and downwardly variable position that is approximately midway between the two beams 2 and 3 but actually a little closer to the rear frame beam 3 than to the leading frame beam 2 (see FIG. 3). The support 6 is provided with four gear boxes 7 two of which are located at substantially the opposite ends of the common support while the other two are located at intermediate positions therealong which are such that the centers of the four gear boxes 7 are spaced apart from one another at regular intervals. Each gear box 7 has a corresponding substantially vertical, or at least upwardly extending, shaft 8 rotatably journalled therein by means of upper and lower ball bearings 9 that are arranged in closely spaced apart relationship at the opposite ends of a corresponding bearing housing 10 that is integral with the bottom of the gear box 7 concerned.

Each shaft 8 projects downwardly beyond the bottom of the corresponding bearing housing 10 where it is externally splined and receives a matchingly internally splined hub 11 at the center of a corresponding substantially horizontally disposed tubular arm 12. As can be seen in FIG. 3 of the drawings, the upper end of each hub 11 abuts against the lower surface of a shoulder or flange 13 of the corresponding shaft 8 that is formed approximately midway along the upright length of that shaft at the bottom of the bearing housing 10 concerned while the lowermost end of each hub 11 is contacted by a corresponding thick washer 14 which is urged upwardly along the shaft 8 concerned by a retaining nut 15 which, with the washer 14, co-operates with a short screwthreaded lowermost end portion of that shaft 8. If desired, positive means, such as a split pin, may co-operate with each nut 15 to ensure that it will not work loose. The opposite ends of each arm 12 are bent over downwardly through substantially 90° to form corresponding downwardly tapering substantially vertically disposed stub shafts 16. The uppermost end of the downwardly tapering portion of each stub shaft 16 is afforded by a corresponding shoulder or flange 17 and the longitudinal axes $b$ of the stub shafts 16 are in parallel, or substantially parallel, relationship with the longitudinal axis $a$ of the corresponding shafts 8. The downwardly tapering portion of each stub shaft 16 has a corresponding tool 18 mounted on it so as to be rotatable about the axis $b$ concerned.

Each tool 18 comprises a substantially horizontally disposed support 19 that is of cruciform cross-section (see FIG. 5), the center of the support 19 being furnished with a hub 20 for rotatable co-operation with the corresponding stub shaft 16. Such rotation is allowed for by the provision of upper and lower vertically spaced apart ball bearings 21. The ball bearings 21 are located at the opposite upper and lower ends of an internal chamber 22 of the hub 20 and their outer races co-operate with shoulders in the internal wall of said chamber. The inner races of the ball bearings 21 are arranged around cylindrically curved regions of the tapering portion of the corresponding stub shaft 16. The inner race of the lower smaller diameter ball bearing 21 bears by its lower surface against the upper surface of a circlip 23 whose inner edge engages in a groove formed in the stub shaft 16 concerned close to the lowermost end of that stub shaft. The top of each hub 20 is closed by the corresponding shoulder or flange 17 which is a close fit therein and beneath which a sealing ring is provided to protect the bearings 21 from contamination by dirt. The bottom of each hub 20 is closed by a corresponding cover plate 24 that fits into the mouth of the hub concerned and that is retained in its operative position by a central bolt 25 whose screwthreaded shank co-operates with a matchingly screwthreaded hole that extends axially into the stub shaft 16 from the lowermost end thereof.

The opposite ends of the support 19 of each tool 18 comprise two sleeve-like tine holders 26 whose longitudinal axes are substantially parallel to the corresponding axis $b$. Each tine holder 26 receives the fastening portion of a corresponding rigid soil working tine 27 that also comprises a soil working portion which extends downwardly towards and/or into the soil from the respective tine holder 26. Although not readily apparent from FIGS. 1 to 5 of the drawings, the downwardly extending straight soil working portions of the tines 27 are inclined rearwardly by a few degrees from top to bottom with respect to the longitudinal axes of the corresponding straight fastening portions of the tines, the rearward inclination being relative to directions in which the tools 18 are intended to revolve about the axes $b$ during the operation of the implement. The soil working portions of the tines 27 may thus be considered as being trailing with respect to those directions. Each positively rotated arm 12 and the corresponding pair of freely rotatable tools 18 (each of which comprises two tines 27) constitutes a rotary soil working or cultivating member 28 which member 28 is positively rotatable, as a whole, about the common longitudinal axis $a$ of the corresponding shaft 8. There are, of course, four of the members 28 and it will be evident from FIG. 1 of the drawings that they are arranged in a single row that is parallel to the frame beams 2, 3 and 5 and to the support 6 with the tools 18 of each member 28 so arranged that, during operation, their tines 27 will work overlapping strips of soil to produce, in effect, a single broad strip of worked soil that extends across the width of the implement. Arrows in FIG. 1 of the drawings indicate that, during operation, each member 28 is positively rotated about the corresponding axis $a$ in a direction that is opposite to the direction of rotation of its neighbour, or each of its neighbours, in the single row of four members.

An upper splined portion of each shaft 8 is provided, inside the corresponding gear box 7, with a crown wheel or other toothed pinion 29 whose teeth are in driven mesh with those of a smaller bevel pinion 30 that is secured to a common driving shaft 31 which extends axially through, and is rotatably mounted in, the hollow support 6 and its gear boxes 7 by way of horizontally disposed ball bearings 32 (FIG. 4). A central region of the support 6 is provided with a further gear box 33 inside which a further bevel pinion (not visible) has its teeth in driven mesh with those of a bevel pinion carried by a shaft (also not visible) that extends substantially horizontally parallel to the direction A. The rearmost end of the last mentioned shaft projects through the back of the gear box 33 into a change-speed gear 34 together with the rearmost end of an overlying shaft 35 that is also substantially horizontally parallel to the direction A. The rearmost ends of both the two substantially horizontal shafts that project into the change-speed gear 34 are splined or otherwise keyed to enable them to receive the matchingly splined or keyed hubs of a chosen pair of interchangeable and/or exchangeable pinions that have straight or spur teeth. Thus, the transmission ratio between the shaft 35 and the underlying substantially parallel shaft is determined by the particular pair of pinions that co-operates with those shafts in the change-speed gear 34 and the arrangement of said pinions on the shafts. The speed of rotation of the four soil working or cultivating members 28 can thus be increased or decreased, as may be desired, without having to change the speed of rotation that is applied to the splined or otherwise keyed end of the shaft 35 that projects forwardly in substantially the direction A from the front of the gear box 33.

Each of the four gear boxes 7 is provided at its front with horizontally spaced apart pairs of upper and lower lugs 36, horizontal pivot pins 37 being entered through the upper two lugs 36 of each gear box 7 and through the two lower lugs 36 thereof. The pivot pins 37 define upper and lower axes that are parallel to the longitudinal axes of the frame beams 2, 3 and 5. The rearmost ends of forwardly convergent arms 38 are coupled to the pins 37 alongside the relatively remote surfaces of the lugs 36 that correspond to each gear box 37 and it will be seen from FIGS. 1, 3 and 4 of the drawings that the leading ends of each pair of forwardly convergent arms 38 are bent over so as to extend parallel to one another, the short parallel portions of each pair being pivotally connected by a corresponding horizontal pin 39 to a corresponding upper lug 40 or lower lug 41 (see FIG. 3), said lugs 40 and 41 being welded or otherwise rigidly secured to the upper and lower surfaces of the frame beam 2, respectively. The pins 39 extend parallel to the pins 37 and to the frame beams 2, 3 and 5 and are spaced apart from one another vertically by substantially the same distance as are the upper and lower pivot pins 37. Each pair of forwardly convergent arms 38 is rigidly interconnected by a corresponding trapezoidal stiffening plate 42. The support 6 and the parts which it carries is thus connected to the beam 2 of the frame 1 by pivotable linkages in the form of four parallelogram linkages that are generally indicated by the reference 43, said linkages 43 being respectively coupled to the four gear boxes 7. Between a lug 42A on a plate 42 on the lower arms 38 and a lug on the beam 2 a resilient mechanism 42B is provided which opposes the movement of the arms 38. With the embodiment shown the mechanism 42B is afforded by a spring which opposes a downward movement. However the said mechanism can also comprise a spring arrangement by means of which as well a downward as an upward movement is resiliently opposed. The tension of the spring shown in FIG. 3 can be adjusted by means of nuts 42C. Althought not shown it will be appriciated that a construction whereby the arms 38 are freely pivotable is also possible. The linkages 43 allow the support 6 and the parts which it carries to move upwardly and downwardly, without significant tilting, relative to the frame 1, said frame 1 being supported from the ground surface in a manner which will be described in detail below. The extent of the upward and downward movement of the support 6 which is possible relative to the frame 1 is limited by the provision, at the rear of each gear box 7, of a pair of upper and lower stops 44 and 45 which stops include limbs that are disposed above and beneath the flat upper and lower surfaces of the rear frame beam 3. These limbs of the stops 44 and 45 are substantially horizontally disposed and carry resilient pads 46 of natural rubber, synthetic rubber or a resilient synthetic plastics material. It will be evident from FIGS. 3 and 4 of the drawings that the stops 44 and 45 make contact with the beam 3 through the intermediary of the pads 46 when the support 6 reaches its upper, or lower, limit position relative to the frame 1.

The leading ends of two arms 47 are pivotally connected to the side plates 4 of the frame 1 by substantially horizontally aligned pivot pins at positions substantially vertically below the hindmost surface of the rear frame beam 3. The arms 47 are turnable upwardly and downwardly alongside the relatively remote outer surfaces of the two side plates 4 and their rearmost ends, which project some distance behind the side plates 4, carry substantially horizontally aligned bearings between which a supporting member 48, in the form of an open ground roller, is rotatably mounted. The supporting member 48 extends throughout substantially the whole of the working width of the four rotary soil working or cultivating members 28 and comprises a central tubular support 49 to which a plurality, such as five, of circular plates 50 are rigidly secured at regular intervals so that each plate 50 has its general plane in substantially parallel relationship with the direction A. Each plate 50 is formed, near its edge, with a plurality, such as eight, of holes and a corresponding number of elongated elements 51 of tubular, or solid rod-like, formation are entered through the holes in the successive plates 50 in such a way that each element 51 is wound helically to some extent around the substantially horizontal axis of rotation of the member 48 that corresponds with the longitudinal axis of its central support 49. Each side plate 4 is formed, close to its rearmost edge, with a curved row of holes 53 that are at equal distances from the axis about which the arms 47 are turnable relative to said side plates. The two arms 47 are formed with single holes at the same distance from said axis and horizontal locking pins 52, or equivalent locking bolts, are provided for entry through the holes in the arms 47 and chosen ones of the holes 53. It can be seen from the drawings that the holes 53 which are selected for co-operation with the locking pins 52, or equivalent locking bolts, determine the level of the axis of rotation of the supporting member 48 relative to that of the frame 1 and thus the level of said frame 1 above the ground surface during the operation of the implement. Upward and downward adjustments of the level of the axis of rotation of the supporting member 48 relative to the frame 1 also control the maximum depth to which the tines 27 of the four soil working or cultivating members 28 can penetrate into the ground. Two stub shafts 54 that are substantially horizontally aligned in a direction that is perpendicular to the direction A are carried by the relatively remote outer surfaces of the two side plates 4 and each stub shaft 54 has a corresponding substantially vertical shield plate 55 mounted on it so as to be turnable upwardly and downwardly alongside the plate 4 concerned. The two shield plates 55 are substantially parallel to one another and to the direction A and the leading edges of both of them are inclined downwardly and rearwardly with respect to the same direction from the upper leading corners of the plates 55 that co-operate with the stub shafts 54. Lowermost edges of the plates 55 are horizontally or substantially horizontally disposed and are arranged to bear more or less slidably against the ground surfaces during the operation of the implement. Each shield plate 55 is provided, near the edge thereof that is rearmost with respect to the direction A with a curved row of holes 57 which holes are equidistant from the axis defined by the stub shafts 54. The side plates 4 are formed with single holes and horizontal locking pins 56, or equivalant bolts, are provided by which the shield plates 55 can be retained in chosen angular positions about the axis defined by the stub shafts 54 upon entering said locking pins 56, or the equivalent bolts, through the single holes in the side plates 4 and chosen holes 57. The shield plates 55 minimise ridging at the opposite edges of the broad strip of land that is worked by the implement during its use and greatly reduce the number of stones and other potentially dangerous objects that are flung laterally of the path of travel of the implement by its tools 18 with a consequent reduction in the risk to adjacent persons, livestock and property. A coupling member or trestle 58 of generally triangular configuration is secured to the frame beams 2 and 5 at the front of the implement and at a location midway between the side plates 4. The coupling member or trestle 58 is constructed and arranged to enable the frame 1 of the implement to be connected to the three-point lifting device or hitch at the rear of an agricultural tractor or other operating vehicle in a manner which is generally known per se and which can be seen in outline in FIGS. 1 and 2 of the drawings.

FIG. 6 illustrates the provision of each positively rotated soil working or cultivating member 28 of the implement with tools 59 which are similar to the previously described tools 18 except that each of them comprises three arms 60A which radiate from the central hub 20 at locations which are spaced apart from one another at angles of substantially 120° around the corresponding axis $b$. It is noted that it can be seen, in FIG. 6 of the drawings, that the downwardly extending straight soil working portions of the tines 27 are inclined by a few degrees to the straight fastening portions of those tines.

In the use of the implement that has been described with reference to FIGS. 1 to 5 of the drawings or with reference to FIGS. 1 to 5 as modified by FIG. 6 of those drawings, the coupling member or trestle 58 at the front of the implement is connected to the three-point lifting device or hitch at the rear of an agricultural tractor or other operating vehicle and a telescopic transmission shaft, which is of a construction that is known per se having universal joints at its opposite ends, is employed to place the forwardly projecting rotary input shaft 35 of the gear box 33 in driven connection with the power take-off shaft of the same tractor or other operating vehicle. Adjustments are, if required, made before the implement commences work and these adjustments include setting the level of the axis of rotation of the member 48 relative to the frame 1 with the aid of the locking pins 52 or equivalent bolts to control the maximum depth to which the tines 27 can penetrate into the soil, setting the positions of the shield plates 55 about the stub shafts 54 to match the level chosen for the rotary supporting member 48 relative to the frame 1, and altering the transmission ratio in the change-speed gear 34 to govern the speed of rotation of the members 28 about the axes $a$ having regard to the nature and condition of the soil that is to be worked and the result that is required after the cultivating/harrowing operation. When the machine actually commences work, the members 28 are, most of the time, resiliently supported. Each soil working or cultivating member 28 is positively rotated about the corresponding axes $a$ in a direction which is opposite to that of the neighbouring member 28, or each of the two neighbouring members 28, in the single row of four members. Each individual tool 18 or 59 also tends to rotate about the corresponding axis $b$ relative to the stub shaft 16 concerned because the downwardly extending portions of its tines 27 penetrate into the soil with the two, or three, soil working portions concerned both or all being inclined rearwardly relative to one circular direction centered upon the corresponding axis $b$. The arrangement is, in fact, such that each tool 18 or 59 tends to rotate more or less regularly about the corresponding axis $b$ in the same direction as does the member 28 of which it forms a part about the corresponding axis $a$. As previously mentioned, the strips of land that are worked by the four rotary members 28 overlap to produce a single broad strip of worked soil.

If, during operation, one of the tools 18 or 59 should engage a large stone or other substantially immovable obstacle in the soil, all four members 28 can move upwardly to allow the tool concerned to ride over that obstacle by bodily displacement of the four members 28 and their common support 6 upwardly relative to the frame 1 by angular displacement of the four parallelogram linkages 43. It will be realised from FIG. 3 of the drawings that such bodily upward displacement cannot take place beyond a level at which the pads 46 of the lower stops 45 come into abutting engagement with thw lower surface of the rear frame beam 3. The four soil working or cultivating members 28 and their support 6 (including the gear boxes 7 and 33) are relatively light in weight as compared with the combined weight of the frame 1 and the other parts of the implement so that said members 28 can move bodily upwards and downwards quite easily, such displacements being particularly facilitated by the omission of a heavy supporting member or members that is or are directly connected to the rotary members 28. The described constructions and arrangements are effective in reducing the incidence of damage to the tools and other parts of each member 28 while the implement is, nevertheless, very effective in operation and can readily match undulations in the surface of the soil that it has to deal with. The tools 18 or 59 of the two members 28 that are located at the opposite ends of the row of four such members co-operate, during operation, with the shield plates 55 and, as mentioned above, little, if any, ridging is produced at the opposite lateral edges of the broad strip of land that is worked by the implement. It is preferred, but is not essential, that the distance between each axis $a$ and the or each immediately neighbouring axis $a$ should be 60–66 centimeters. It is preferred, but is not essential, that the distance between the two axes of rotation $b$ in each member 28 should be substantially 45 centimeters. With these dimensions, the distance between each axis $b$ and the corresponding axis $a$ is substantially three-quarters of the working width of one of the tools 18 or 59, the latter dimension having a magnitude of substantially 30 centimeters. The implement is arranged for inoperative transport by lifting it clear of the ground by raising the threepoint lifting device or hitch of the agricultural tractor or other operating vehicle to which the implement is connected. When the implement is so lifted, the pads 46 that are carried by the upper stops 44 bear downwardly against the upper surface of the underlying rear frame beam 3 and prevent the rotary members 28 from moving too far downwardly.

The soil cultivating implement that has been described also forms the subject of our co-pending patent application Ser. No. 691,986, filed June 2, 1976 to which reference is directed.

Although various features of the two embodiments of the soil cultivating implement that have been described and/or that are illustrated in the accompanying drawings will be set forth in the following claims as inventive features, it is emphasised that the invention is not necessarily limited to those features and that it includes within its scope each of the parts of the two soil cultivating implement embodiments that has been described and/or that is illustrated in the accompanying drawings, both individually and in various combinations.

What we claim is:

1. A rotary harrow comprising a frame and a plurality of soil working members supported on said frame, said soil working members being rotatable about axes defined by corresponding upwardly extending shafts located in a row that extends transverse to the direction of travel of the harrow, driving means connected to each of said shafts to rotate same and each soil working member consisting of two soil working tools which are located at substantially diametrically opposite sides of the corresponding axis of rotation of that member, each of said tools being freely rotatable about a respective upwardly extending axis responsive to contact of that tool with the ground and each tool having downwardly extending tine means positioned to contact and work the soil during operation, said soil working member being independently movably connected to said frame by corresponding support means and said frame supported above the ground during operation by a rotatable supporting member positioned behind the row of soil working members, with respect to the direction of travel, said rotatable member being connected to the frame with arms.

2. A harrow as claimed in claim 1, wherein said rotatable supporting member is a roller that rotates about a substantially horizontal axis that extends transverse to the direction of travel.

3. A harrow as claimed in claim 2, wherein said roller is pivoted to the frame by said arms and adjustable in level relative to said frame, said roller extending across substantially the entire working width of said harrow.

4. A harrow as claimed in claim 3, wherein said roller has a circumference defined by a plurality of elongated elements that extend in the same general direction as the axis of rotation of said roller, said elements being positioned helically around the axis of rotation of said roller.

5. A harrow as claimed in claim 1, wherein the tools of each soil working member are fastened to arm means of said member and rotatable relative to said arm means about respective upwardly extending stub shafts, said stub shafts extending substantially parallel to the shaft of the corresponding soil working member.

6. A rotary harrow comprising a frame and a plurality of soil working members supported on said frame, said soil working members being rotatable about axes defined by corresponding upwardly extending shafts located in a row that extends transverse to the direction of travel, driving means connected to each of said shafts to rotate same and each soil working member including a common support arm and consisting of two diametrically spaced apart tools mounted on said common arm, each tool comprising a support and downwardly extending tine means on said support, each tool being freely rotatable about a respective upwardly extending axis, responsive to the tine means contacting the ground, the axis of rotation of said tool being located substantially centrally with respect to said tine means, said soil working member being independently movably connected to said frame by corresponding support means and said frame supported above the ground during operation by a rotatable supporting member positioned behind the row of soil working members, with respect to the direction of travel, said rotatable member being connected to the frame with arms.

7. A rotary harrow comprising a frame and a plurality of soil working members supported on said frame, said soil working members being rotatable about axes defined by corresponding upwardly extending shafts located in a row that extends transverse to the direction of travel, driving means connected to each of said shafts to rotate same and each soil working member including a common support arm and at least two diametrically spaced apart tools mounted on said arm, each tool comprising a support and downwardly extending tine means on said support, said tool being rotatable about its respective upwardly extending axis of rotation responsive to the tine means contacting the ground, the distance between the respective axes of rotation of said two tools along said arm being about three-quarters the working width of said tine means during operation, said soil working member being independently movably connected to said frame by corresponding support means and said frame supported above the ground during operation by a rotatable supporting member positioned behind the row of soil working members, with respect to the direction of travel, said rotatable member being connected to the frame with arms.

* * * * *